(12) United States Patent
Or

(10) Patent No.: US 11,725,945 B2
(45) Date of Patent: Aug. 15, 2023

(54) SYSTEM AND METHOD FOR PROVIDING LOCALIZATION USING INERTIAL SENSORS

(71) Applicant: Alma Technologies Ltd., Haifa (IL)

(72) Inventor: Barak Or, Haifa (IL)

(73) Assignee: ALMA Technologies Ltd., Haifa (IL)

( * ) Notice: Subject to any disclaimer, the term of this patent is extended or adjusted under 35 U.S.C. 154(b) by 0 days.

(21) Appl. No.: 17/979,126

(22) Filed: Nov. 2, 2022

(65) Prior Publication Data
US 2023/0055498 A1 Feb. 23, 2023

Related U.S. Application Data

(63) Continuation-in-part of application No. PCT/IL2022/050064, filed on Jan. 16, 2022, which is a continuation-in-part of application No. 17/337,632, filed on Jun. 3, 2021, which is a continuation-in-part (Continued)

(51) Int. Cl.
| | |
|---|---|
| *G01C 21/20* | (2006.01) |
| *G01C 21/16* | (2006.01) |
| *G06N 3/08* | (2023.01) |
| *G06N 3/04* | (2023.01) |
| *G01S 19/43* | (2010.01) |
| *G01S 19/41* | (2010.01) |

(Continued)

(52) U.S. Cl.
CPC ........... *G01C 21/165* (2013.01); *G01C 21/20* (2013.01); *G01S 19/41* (2013.01); *G01S 19/43* (2013.01); *G01S 19/46* (2013.01); *G01S 19/47* (2013.01); *G06N 3/04* (2013.01); *G06N 3/08* (2013.01)

(58) Field of Classification Search
CPC ....... G01C 21/165; G01C 21/20; G01S 19/41; G01S 19/43; G01S 19/46; G01S 19/47; G06N 3/04; G06N 3/08
See application file for complete search history.

(56) References Cited

U.S. PATENT DOCUMENTS

| | | |
|---|---|---|
| 2018/0180420 A1 | 6/2018 | Korenberg |
| 2019/0204092 A1 | 7/2019 | Wheeler |
| 2020/0202521 A1 | 6/2020 | Joyce |

(Continued)

FOREIGN PATENT DOCUMENTS

CA 2733032 A1 8/2012

OTHER PUBLICATIONS

Dishashree Gupta, "Transfer learning and the art of using pretrained models in deep learning", Jun. 1, 2017, pp. 1-14; https://www.analyticsvidhya.com/blog/2017/06/transfer-learning-the-art-of-fine-tuning-a-pretrained-model/.

(Continued)

*Primary Examiner* — Mathew Franklin Gordon
(74) *Attorney, Agent, or Firm* — Pearl Cohen Zedek Latzer Baratz LLP

(57) ABSTRACT

A system and method for providing localization, including, during a training phase: obtaining a training dataset of accelerations, angular velocities, and known locations over time of vehicles moving in a defined area; and training a machine learning model to provide location estimation in the defined area based on the accelerations and angular velocities using the training dataset; and during runtime phase: obtaining runtime accelerations and angular velocities overtime of a vehicle moving in the defined area; and using the trained model to obtain current location of the vehicle based on the runtime acceleration and angular velocities.

18 Claims, 8 Drawing Sheets

Related U.S. Application Data of application No. 17/484,346, filed on Sep. 24, 2021, now abandoned.

(60) Provisional application No. 63/138,153, filed on Jan. 15, 2021.

(51) Int. Cl.
*G01S 19/46* (2010.01)
*G01S 19/47* (2010.01)

(56) References Cited

U.S. PATENT DOCUMENTS

| | | | |
|---|---|---|---|
| 2020/0250473 A1 | 8/2020 | Elluswamy |
| 2020/0311514 A1 | 10/2020 | Speranzon |
| 2021/0033738 A1 | 2/2021 | Liang |
| 2021/0146949 A1 | 5/2021 | Martinez Covarrubias |

OTHER PUBLICATIONS

International Search Report and Written Opinion for PCT Application No. PCT/IL2022/050064, dated May 11, 2022.
Office action for U.S. Appl. No. 17/484,346, dated Oct. 22, 2021.

SYSTEM AND METHOD FOR PROVIDING LOCALIZATION USING INERTIAL SENSORS

CROSS-REFERENCE TO RELATED APPLICATIONS

This application is a continuation-in-part of PCT International Application No. PCT/IL2022/050064, filed Jan. 16, 2022, which is a continuation-in-part of U.S. patent application Ser. No. 17/337,632, filed Jun. 3, 2021, and a continuation-in-part of U.S. patent application Ser. No. 17/484,346, filed Sep. 24, 2021, and which claims priority from U.S. Provisional Patent Application No. 63/138,153, filed Jan. 15, 2021, all of which are hereby incorporated by reference in their entireties.

FIELD OF THE INVENTION

The present invention relates generally to localization technology and, more specifically, to localization based on inertial sensors.

BACKGROUND OF THE INVENTION

The need for high-accuracy localization, positioning, and mapping solutions in real-time exists in many domains and applications. Current outdoor localization technology typically utilizes a satellite navigation device, also referred to as global navigation satellite system (GNSS) including for example, global positioning system (GPS), GLONASS, Galileo, Beidou and other satellite navigation systems. Drivers use GNSS systems routinely for localization and navigation. In addition, autonomous vehicle companies integrate localization and mapping sensors and algorithms to achieve high-accuracy localization solutions for driver safety.

However, GNSS cannot be used for indoor navigation, localization, or positioning applications. Indoor navigation, localization or positioning applications may include, for example, navigating robots or vehicles in storage warehouses that are used to monitor and provide equipment efficiently, or navigating in an indoor parking lot. Today, indoor localization is typically performed by applying sensor fusion schemes, where data acquired by many types of sensors is integrated to provide an estimation of the location of the vehicle.

In addition, GNSS may not provide adequate accuracy for some outdoor localization applications as well. For example, localization systems for autonomous vehicles may require higher accuracy than is provided by GNSS. Thus, localization systems for autonomous vehicles may also use sensor fusion to achieve high-accuracy localization solutions. The sensors may include a camera, LIDAR, inertial sensors, and others. Unfortunately, these sensors may be expensive, and the quality of the data they provide may depend on various physical conditions, such as day and night, light and dark, urban canyon, and indoor environments. Hence, there is no high-accuracy localization and mapping solution for vehicles, both indoor and outdoor.

SUMMARY OF THE INVENTION

According to some embodiments of the present invention, a system of training a deep learning neural network (DL NN) model for determining a location of a vehicle moving along a known route in terms of geographic location, based on inertial measurement unit (IMU) measurements is provided. The system may include: an IMU within said vehicle configured to measure a series of angular velocities and accelerations sensed at a plurality of locations for each section of a plurality of sections along said route; a computer processor configured to calculate, for each of the sections along said route, and based on the series of angular velocities and accelerations sensed at the plurality of locations in one of the sections, a kinematic signature which is unique to said one of the sections, compared with kinematic signatures of rest of the sections; and a positioning source other than said IMU configured to obtain a positioning measurement of said vehicle for each of the sections, wherein the computer processor is further configured to associate each one of the kinematic signatures with a respective positioning measurement obtained via said positioning source other than said IMU, and wherein the computer processor is further configured to train a deep learning neural network (DL NN) model using a dataset comprising said kinematic signatures associated with the respective positioning measurements, to yield trained DL NN model.

A computer-based system and method for providing localization may include: during a training phase: obtaining a training dataset of accelerations, angular velocities, and known locations over time of vehicles moving in a defined area; and training a machine learning model to provide location estimation in the defined area based on the accelerations and angular velocities using the training dataset; during runtime phase: obtaining runtime accelerations and angular velocities over time of a vehicle moving in the defined area; and using the trained model to obtain current location of the vehicle based on the runtime acceleration and angular velocities.

According to some embodiments of the invention, the accelerations, angular velocities of the training set and the runtime acceleration and angular velocities may be measured using at least one inertial measurement unit (IMU).

According to some embodiments of the invention, the IMU may include at least one three-dimensional accelerometer and at least one three-dimensional gyroscope.

According to some embodiments of the invention, the machine learning model may be a neural network.

Some embodiments of the invention may include, during the training phase: extracting features from the accelerations and angular velocities of the training dataset and adding the features to the training dataset; and during the runtime phase: extracting runtime features from the runtime accelerations and angular velocities; and using the trained model to obtain the current location of the vehicle based on the runtime acceleration, the runtime angular velocities and the runtime features.

According to some embodiments of the invention, the features may be selected from velocity and horizontal slope.

According to some embodiments of the invention, during the training phase, the known locations may be obtained from at least one of the list including: a global navigation satellite system (GNSS) receiver and a real-time kinematic (RTK) positioning system.

According to some embodiments of the invention, the defined area may include a route.

Some embodiments of the invention may include dividing mapping of the defined area into segments, and according to some embodiments, the location may be provided as a segment in which the vehicle is located.

Some embodiments of the invention may include performing anomaly detection to find changes in defined area.

Some embodiments of the invention may include obtaining readings from at least one sensor selected from, a GNSS receiver, a Lidar sensor and radio frequency (RF) sensor; and using the readings to enhance an accuracy of the current location provided by the trained ML model.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1A:
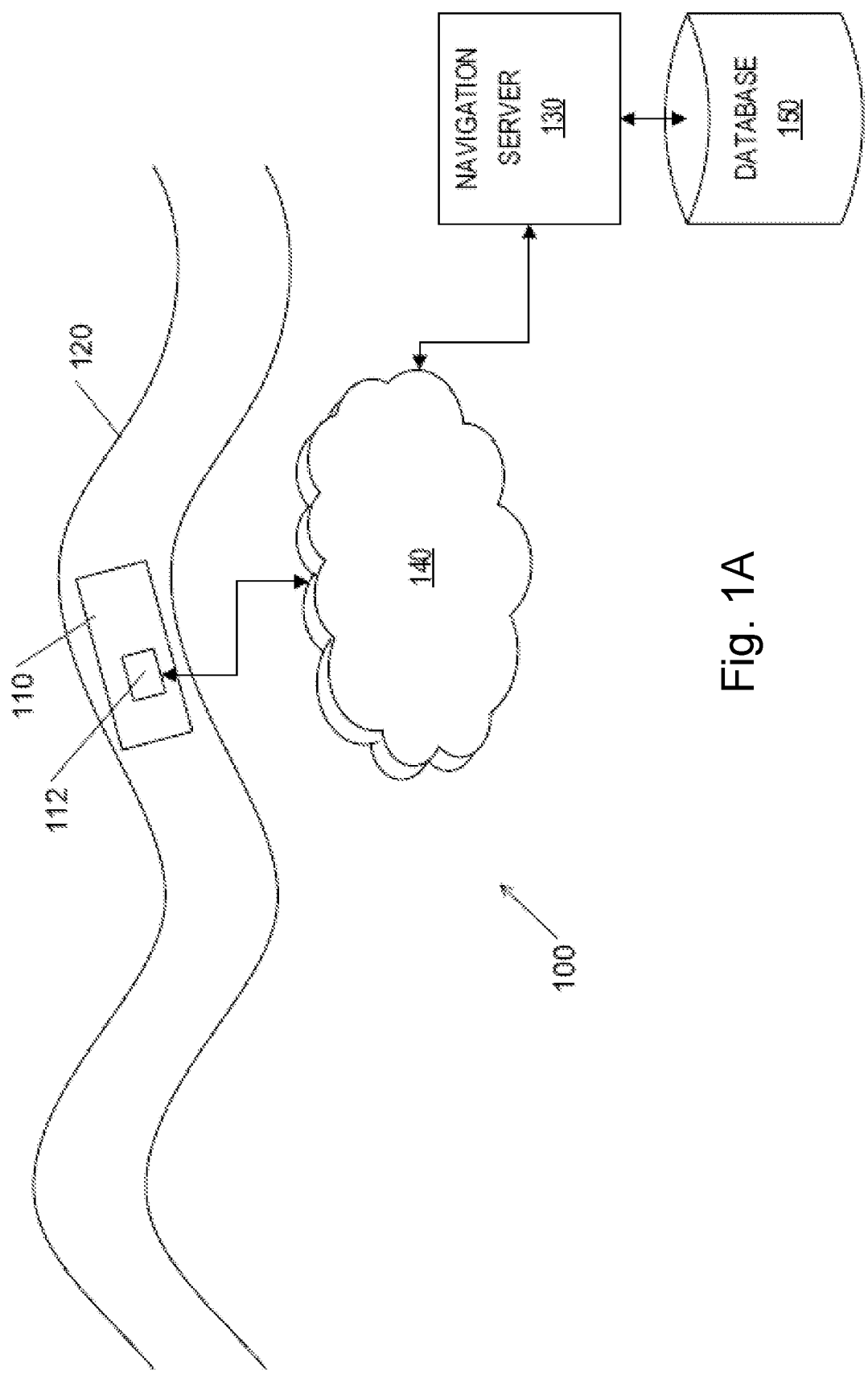
FIG. 1A presents a system for providing localization of a vehicle, according to some embodiments of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Today, vehicles, cars, robots, and other moving ground platforms, commonly referred to herein as vehicles, may use many sensors in a sensor-fusion framework to obtain a localization solution in real-time. The sensors used may include cameras, inertial sensors, Lidar, and RF sensors. These sensors typically suffer from considerable disadvantages and are unable to provide the high-accuracy needed for various scenarios, such as indoor localization where no GNSS reception is available and outdoor localization for autonomous vehicles where the accuracy provided by GNSS is still not high enough to allow safe-driving. Other applications that may require the high-accuracy navigation may include navigating around a parking lot and navigating a tractor or other agricultural vehicles in a field, where the tractor needs to cover an entire field efficiently, e.g., without leaving any part of the field uncovered and with minimal repetitions.

An inertial measurement unit (IMU) may be or may include an electronic device configured to measure the specific force, angular velocity, magnetic field and the orientation of a vehicle, typically using one or more accelerometers, e.g., three-dimensional accelerometers, gyroscopes, e.g., one three-dimensional gyroscopes, and optionally magnetometers. In some implementations, IMUs may be used in strapdown inertial navigation system (SINS), where the IMU sensor is physically attached to the body of the vehicle and measurements are integrated into motion equations. Moving along surfaces, roads, and other terrains results in a dynamic change of the IMU readings. As such, the sensor readings contain intrinsic knowledge regarding the changes in location, which may be used to calculate the current location of the vehicle. However, current IMUs used in SINS typically suffer from biases and drift over time, making SINS problematic for high-accuracy localization and positioning solutions when used alone, without any accurate measurement update.

Some embodiments of the invention aim to solve the high-accuracy localization and positioning problem in real-time for vehicles using inertial sensors by using machine learning (ML) models. For example, according to some embodiments of the invention, readings of the inertial sensors may be provided as input to a deep learning (DL) neural network (NN) model.

According to some embodiments of the invention, signals from IMUs may be provided to an ML model that may provide the position or location of the vehicle. The signals provided by IMUs may include information indicative of accelerations, angular velocities, and time as raw data. Additionally, features may be calculated based on raw data, such as velocity and horizontal slope, etc.

Some embodiments of the invention may include training a machine learning model to provide location estimation using a training dataset of accelerations, angular velocities, and known locations over time of vehicles moving in a defined area. By providing a large training dataset to the model and performing optimization techniques (e.g., training and testing using for example cross validation via k-folds), a functional mapping may be established. Once completed, raw data information measured by IMUs of vehicles, may be provided to the trained ML model, and the trained model may provide location or position estimation of the moving vehicle in real time.

Some embodiments of the invention may include a system of training a deep learning neural network (DL NN) model for determining a location of a vehicle moving along a known route in terms of geographic location, based on inertial measurement unit (IMU) measurements, the system comprising: an IMU within said vehicle configured to measure a series of angular velocities and accelerations sensed at a plurality of locations for each section of a plurality of sections along said route; a computer processor configured to calculate, for each of the sections along said route, and based on the series of angular velocities and accelerations sensed at the plurality of locations in one of the sections, a kinematic signature which is unique to said one of the sections, compared with kinematic signatures of rest of the sections; and a positioning source other than said IMU configured to obtain a positioning measurement of said vehicle for each of the sections, wherein the computer processor is further configured to associate each one of the kinematic signatures with a respective positioning measurement obtained via said positioning source other than said IMU, and wherein the computer processor is further configured to train a deep learning neural network (DL NN) model using a dataset comprising said kinematic signatures associated with the respective positioning measurements, to yield trained DL NN model.

According to some embodiments of the invention, the IMU may include at least one three-dimensional accelerometer and at least one three-dimensional gyroscope.

According to some embodiments of the invention, the kinematic signature may be indicative of at least one of: horizontal slope of the section and horizontal curve of the respective section.

According to some embodiments of the invention, the positioning source comprises at least one of: a global navigation satellite system (GNSS) receiver and a real-time kinematic (RTK) positioning system, and camera/LiDAR/RADAR, and beacons.

According to some embodiments of the invention, the route comprises a route which is known in terms of geographic locations along its length.

According to some embodiments of the invention, the computer processor is further configured to: obtain, a real-time series of angular velocities and accelerations sensed at a plurality of locations along the route by the IMU within the vehicle; apply the real-time series of angular velocities and accelerations sensed at a plurality of locations to the trained DL NN model, to classify the real-time series of angular velocities and accelerations into one of the sections, based on the respective kinematic signature thereof; and determine the position of the vehicle, based geographical location associated with the section classified by the DL NN model.

According to some embodiments of the invention, the ML model may be or may include a NN model, and more specifically, a DL NN. A NN may include neurons and nodes organized into layers, with links between neurons transferring output between neurons. Aspects of a NN may be weighed, e.g., links may have weights, and training may involve adjusting weights. Aspects of a NN may include transfer functions, also referred to as nonlinear activation functions, e.g., an output of a node may be calculated using a transfer function. A NN may be executed and represented as formulas or relationships among nodes or neurons, such that the neurons, nodes or links are "virtual", represented by software and formulas, where training or executing a NN is performed by for example a dedicated or conventional computer. A DL NN model may include many neurons and layers with non-linear activation functions such as convolutional, Softmax, rectified linear unit (ReLU), etc.

The training dataset may be generated in a tagging procedure for a given area or environment. For example, a designer may map the entire area (e.g., a route, a parking lot, tunnels, urban canyons and other areas where GNSS reception is poor etc.) where a batch of raw data may be tagged or labeled with the correct location. This process may be improved with user-recorded raw data information and shared on a cloud.

Thus, some embodiments of the invention may improve the technology of positioning and localization by providing high-accuracy localization solutions based on IMU signals and DL ML schemes in real-time. In addition, some embodiments of the invention may provide a database of terrain information for various areas such as routes, parking lots, tunnels and urban canyons and keep updating the database. Some embodiments may find anomalies in the received signals, adjust the DL NN model online, and provide notifications regarding terrain anomalies in a vehicle's network for safe driving, where pits and other danger road modification will be shared among all users in a defined zone.

FIG. 1A depicts a system 100 for providing localization of a vehicle, according to some embodiments of the invention. According to one embodiment of the invention, system 100 may include a vehicle 110, equipped with one or more sensor unit 112 that may measure and provide data including at least one of specific force, angular velocity and/or the orientation of a vehicle, typically using at least one accelerometer, three-dimensional accelerometer, gyroscope and/or three-dimensional gyroscope. For example, sensor unit 112 may be or may include an IMU or an SINS, e.g., may be physically attached to the body of vehicle 110. Sensor unit 112 may further include a processor and a communication module for initial processing and transmitting of data measured by sensor unit 112 to navigation server 130. In the example provided in FIG. 1, vehicle 110 may be a vehicle moving along a road, way, path or route 120. This example is not limiting, and system 100 may include a vehicle moving in any defined area, such as a parking lot, a tunnel, a field, an urban canyon (e.g., areas is cities where reception of signals from GNSS is poor), or in another confined area, or an indoor vehicle, a robot or any other indoor vehicle moving in a confined indoor area. Sensor unit 112 may provide the data measured by sensor unit 112 to a navigation server 130 directly or through networks 140.

Networks 140 may include any type of network or combination of networks available for supporting communication between sensor unit 112 and navigation server 130. Networks 340 may include for example, a wired, wireless, fiber optic, cellular or any other type of connection, a local area network (LAN), a wide area network (WAN), the Internet and intranet networks, etc. Each of navigation server 130 and sensor unit 112 may be or may include a computing device, such as computing device 700 depicted in FIG. 7. One or more databases 150 may be or may include a storage device, such as storage device 730. In some embodiments, navigation server 130 and database 150 may be implemented in a remote location, e.g., in a 'cloud' computing system.

According to some embodiments of the invention, navigation server 130 may store in database 150 data obtained from sensor unit 112 and other data such as ML model parameters, mapping of terrain and/or route 120, computational results, and any other data required for providing localization or positioning data according to some embodiments of the invention. According to some embodiments of the invention, navigation server 130 may be configured to obtain, during a training phase, a training dataset of accelerations, angular velocities, and known locations over time of vehicles 110 moving in a defined area or route 120, and to train an ML model, e.g., a DL NN model, to provide location estimation in the defined area or route 120 based on the accelerations and angular velocities using the training dataset. For example, navigation server 130 may be configured to obtain, during a training phase, a training dataset of accelerations, angular velocities over time as measured by sensor unit 112. For generating the training data set, the data measured by sensor unit 112 may be tagged or labeled with the known locations. According to some embodiments, during the training phase, navigation server 130 may obtain the known locations from at least one of a GNSS receiver and a real-time kinematic (RTK) positioning system. Other methods may be used to obtain the location data.

Figure 1B:
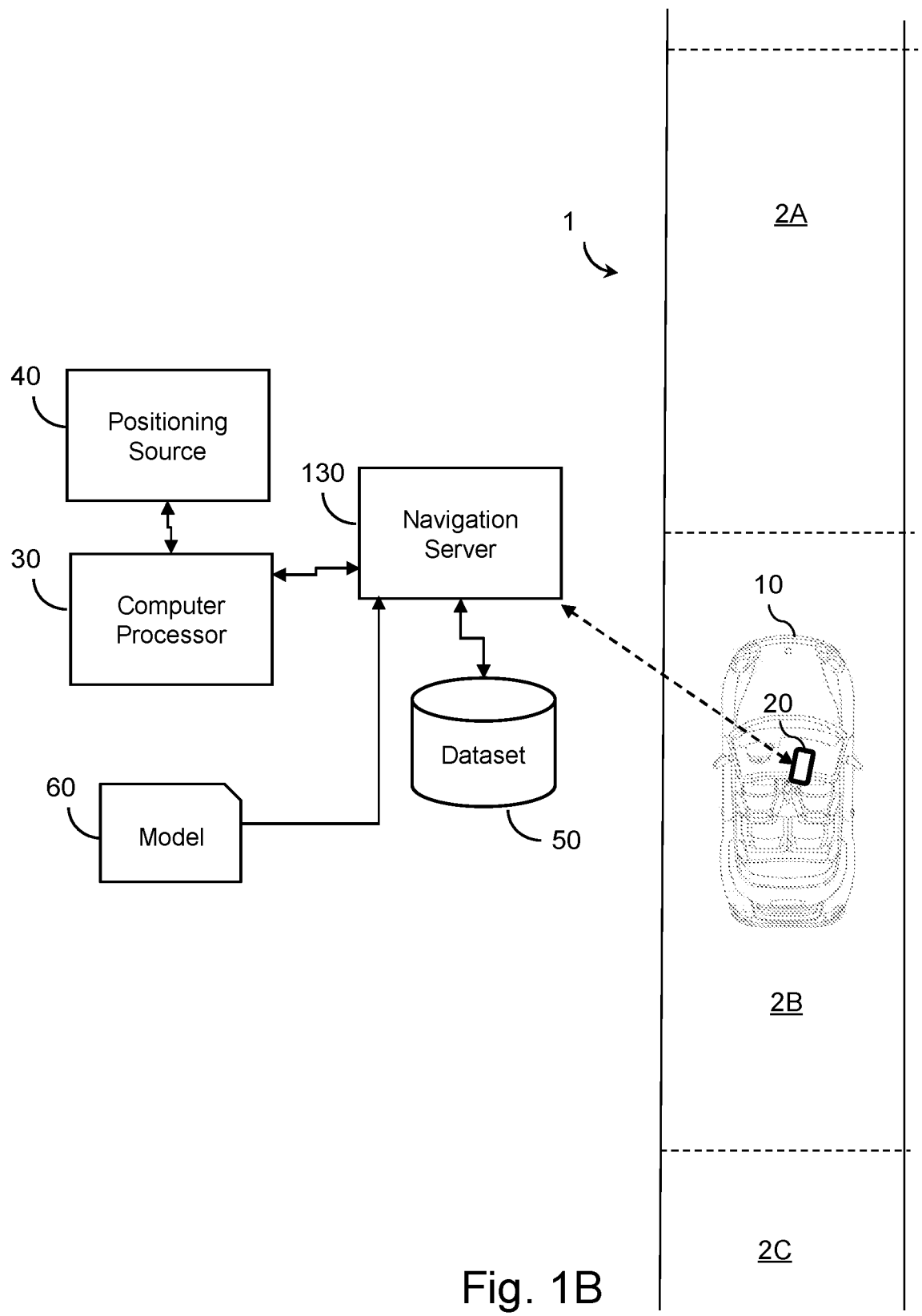
FIG. 1B presents a system for providing localization of a vehicle in further details, according to some embodiments of the invention.

FIG. 1B presents a system for providing localization of a vehicle in further details, according to some embodiments of the invention. According to some embodiments of the present invention, a system of training a deep learning neural network (DL NN) model for determining a location of a vehicle moving along a known route in terms of geographic location, based on inertial measurement unit (IMU) measurements is implemented by navigation server 130. The system may include: an IMU 20 within a vehicle 10 configured to measure a series of angular velocities and accelerations sensed at a plurality of locations for each section of a plurality of sections 2A to 2C along route 1; a computer processor 30 configured to calculate, for each of sections 2A to 2C along route 1, and based on the series of angular velocities and accelerations sensed at the plurality of locations in one of the sections, a kinematic signature which is unique to the one of the sections, compared with kinematic signatures of rest of the sections; and a positioning source 40 other than IMU 20 configured to obtain a positioning measurement of vehicle 10 for each of the sections 2A to 2C, wherein the computer processor 30 is further configured to associate each one of the kinematic signatures with a respective positioning measurement obtained via the positioning source other than the IMU, and wherein the computer processor is further configured to train a deep learning neural network (DL NN) model using a dataset 50 comprising the kinematic signatures associated with the respective positioning measurements, to yield trained DL NN model 60.

According to some embodiments of the invention, navigation server 130 may be further configured to, during a runtime phase, obtain runtime accelerations and angular velocities over time of a vehicle 110 moving in the defined area or route 120 and use the trained model to obtain current location of vehicle 110 based on the runtime acceleration and angular velocities.

According to some embodiments of the invention, navigation server 130 may be further configured to, during the training phase, extract features from the accelerations and angular velocities of the training dataset and add the features to the training dataset. For example, the features may include velocity, horizontal slope and/or other features. Navigation server 130 may be further configured to, during the runtime phase, extract the same type of features from the runtime accelerations and angular velocities, and use the trained model to obtain the current location of the vehicle 112 based on the runtime acceleration, the runtime angular velocities and the runtime features.

Figure 2:
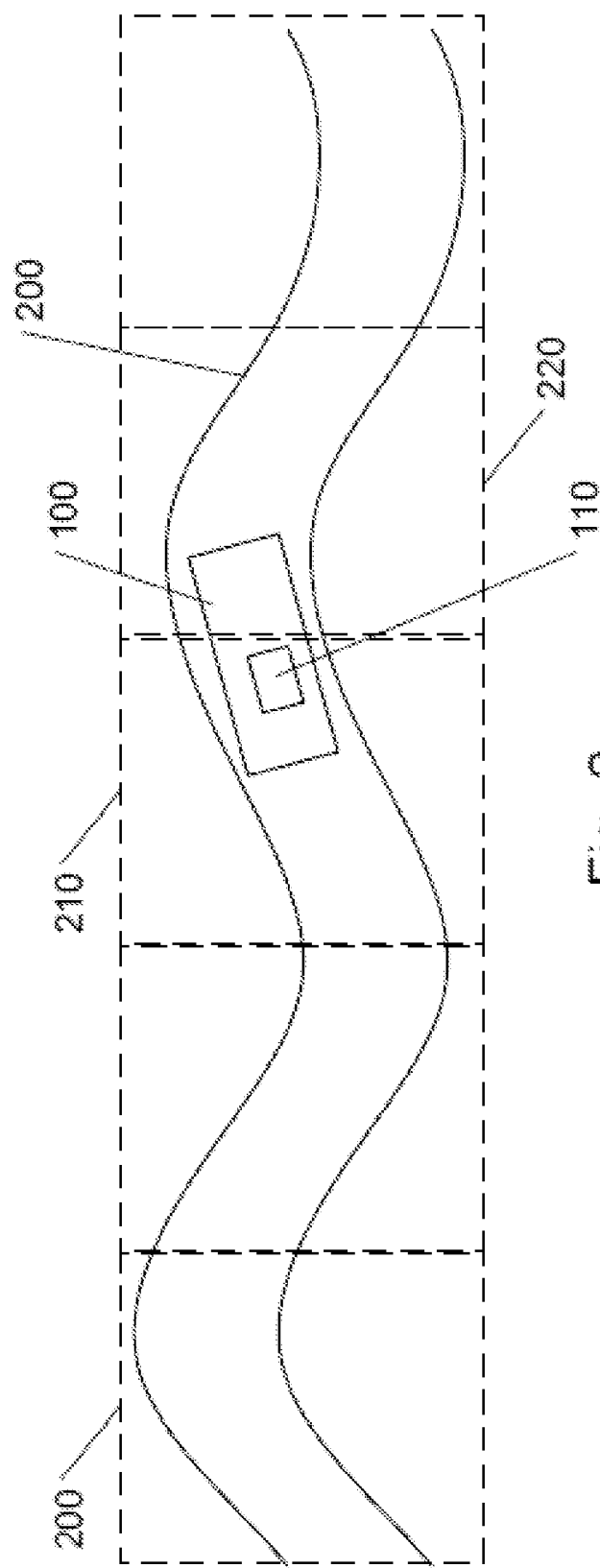
FIG. 2 presents the defined area or route divided into segments, according to some embodiments of the invention.

According to some embodiments of the invention, navigation server 130 may have mapping of the defined area or route 120. In some embodiments, navigation server 130 may divide the mapping of the defined area or route 120 into segments and may provide or express the location of vehicle 110 a segment in which the vehicle 110 is located. Referring to FIG. 2, a defined area or route 120 divided into segments is presented, according to some embodiments of the invention. In FIG. 2, the dashed squares/rectangles represent segments 200, and the location of vehicle 110 is between segments 210 and 220. Other methods may be used to provide or express the location of vehicle 110, e.g., using coordinates.

Figure 3:
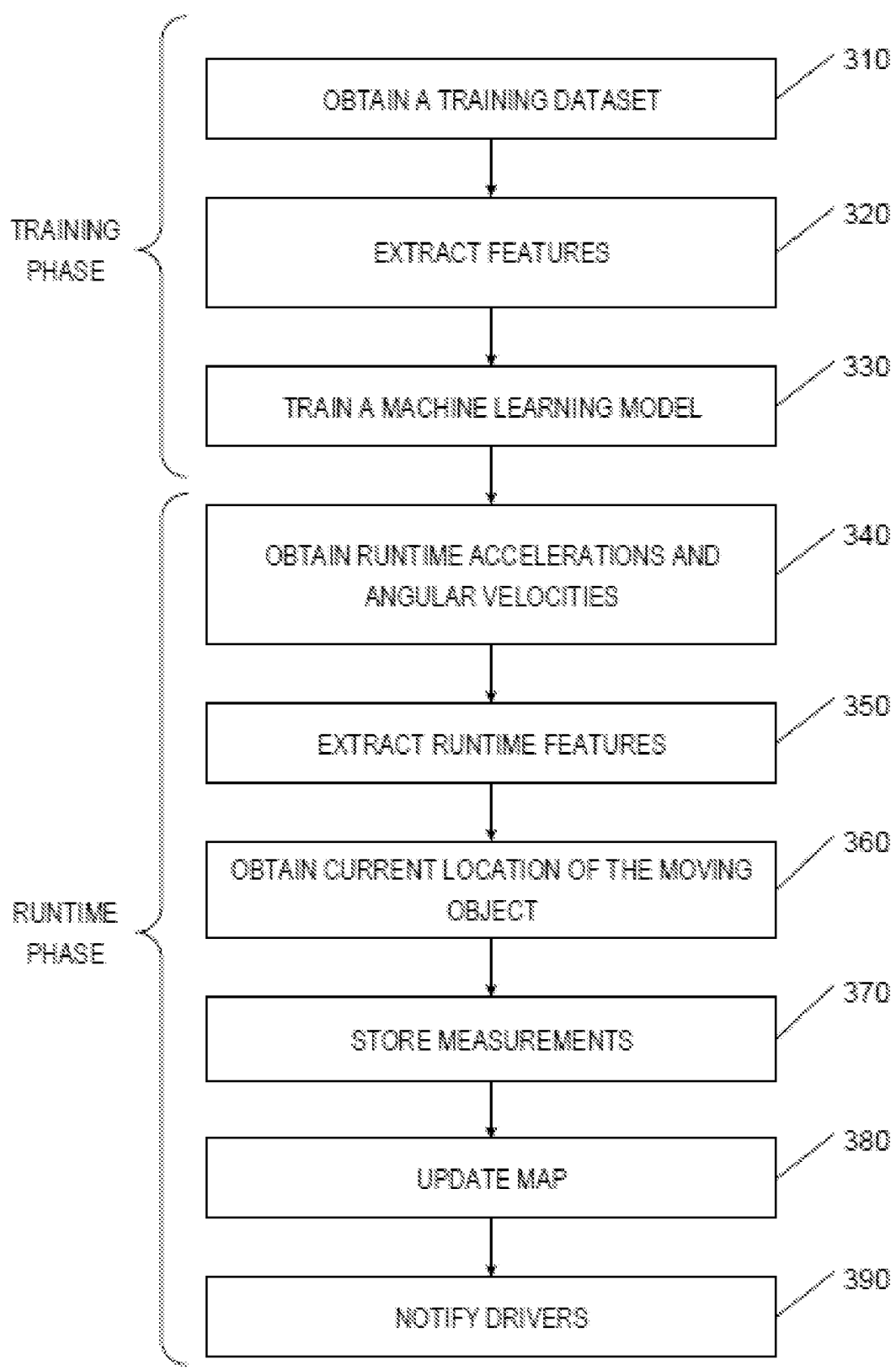
FIG. 3 shows a flowchart of a method, according to some embodiments of the present invention.

FIG. 3 shows a flowchart of a method according to some embodiments of the present invention. The operations of FIG. 3 may be performed by the systems described in FIGS. 1 and 7, but other systems may be used.

Figure 4:
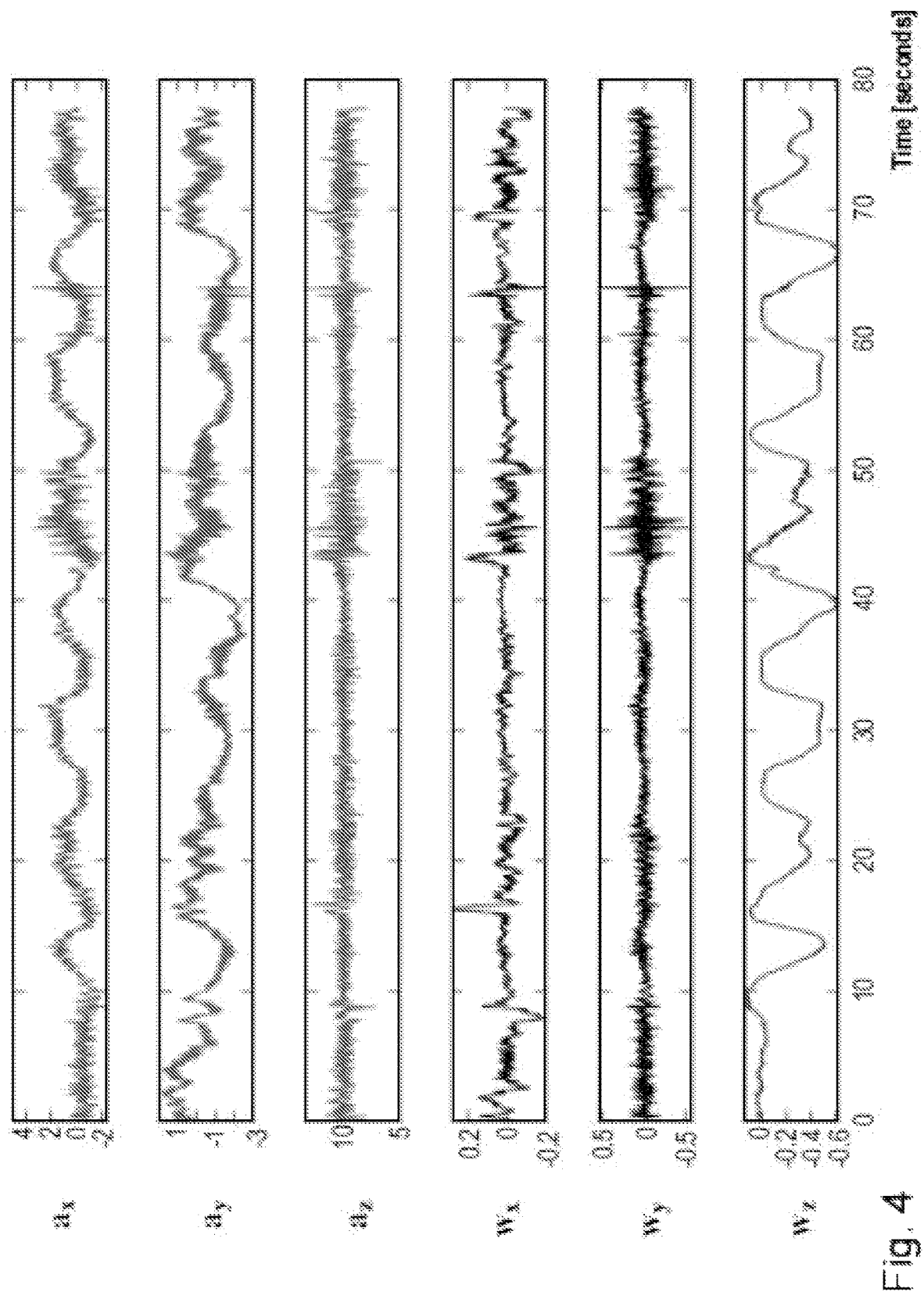
FIG. 4 presents an example of accelerations in the x, y and z directions and angular velocities in the x, y and z directions, according to some embodiments of the invention.

In operation 310, a training dataset of accelerations, angular velocities, and known locations over time of vehicles moving in a defined area may be obtained. For example, the accelerations and angular velocities may be measured by a sensor unit 112 including, for example, an IMU, and the known locations may be obtained from a GNSS receiver and/or a RTK positioning system. Other positioning systems may be used. An example of raw data measured by sensor unit 112 is presented in FIG. 4, which depicts an example of accelerations in the x, y and z directions (labeled $a_x$, $a_y$ and $a_z$, respectively) and angular velocities in the x, y and z directions (labeled $w_x$, $w_y$ and $w_z$, respectively), measured by a sensor unit 112 that is attached to a vehicle 110 moving along defined area or route 120.

Defined area or route 120 may include a uniform or non-uniform terrain, where pits, speed bumps, and more artifacts may be presented. During the motion of vehicle 110, sensor unit 112 may measure signals that may represent the movement of vehicle 110, as sensor unit 112 may be physically attached or integrated with the body of vehicle 110, and may record the raw data with respective time. Considering an indoor environment, location or position information may be obtained or generated manually or using any applicable indoor positioning methods including Wi-Fi positioning, capturing images of vehicle 110 over time and extracting the location or position of vehicle 110 from the images, etc. The position or location data may be provided in any applicable manner including spatial coordinates, segments, etc. For example, if the defined area 120 is a parking lot, the parking number may be used as the location indication or label. In some embodiments, the defined area or route 120 may be divided into segments, as demonstrated in FIG. 2, and location or position data may be provided as the segment in which vehicle 110 is present.

In operation 320, features from the accelerations and angular velocities of the training dataset may be extracted and added to the training dataset. The features may include, for example, the estimated velocity and horizontal slope. The estimated velocity and horizontal slope may be extracted, calculated or obtained by applying classical approaches, such as integration of the integration of the accelerometer readings (e.g., the measured acceleration) and gyroscope readings (e.g., the measured orientation). The training dataset may include a plurality of recordings made by the same or different vehicles 110 moving again and again in the defined area or route 120.

In operation 330, an ML model, e.g., a DL NN or other model may be trained to provide location estimation in the defined area based on the accelerations and angular velocities (and/or extracted features) using the training dataset. For example, the training dataset may be provided to the ML model and used in the training phase to adjust model parameters (e.g., weights) of the ML model. For example, the model parameters may be adjusted through a backpropagation training scheme, while the parameters of the ML model may be tuned or adjusted over and over until a loss function is minimized. A generalization of the solution may be achieved by using a nonlinear activation function, such as Sigmoid, ReLU, and Softmax, and a large number of neurons, convolutional, and recurrent layers. Eventually, during the training phase (e.g., operations 310-330), a trained ML model may be obtained or generated.

In operation 340, runtime accelerations and angular velocities over time of vehicle 110 moving in defined area or route 120 may be obtained. As in the training phase, the accelerations and angular velocities may be measured by sensor unit 112 including, for example an IMU that is physically attached to the body of vehicle 110. In operation 350, runtime features may be extracted or calculated from the runtime accelerations and angular velocities, similarly to operation 320. In operation 360, the trained model may be used to obtain current location of vehicle 110 based on the runtime acceleration and angular velocities and/or features. For example, the dataset of accelerations and angular velocities as measured by sensor unit 112 as well as the extracted features may be provided or feed into the trained ML model, and the trained ML model may provide an estimation of the current location of vehicle 110 in real time.

In some embodiments, the trained model may be used together with other sensors such as a camera, a GNSS receiver, a Lidar sensor, radio frequency (RF) sensor, etc., to enhance the accuracy of the location provided by the trained ML model using sensor fusion frameworks. Sensor fusion may be used in the field of accurate navigation and mapping solutions to combine or integrate data acquired by many types of sensors to provide an estimation of the location of the vehicle that is more accurate than each sensor taken alone. In sensor fusion schemes, the sensor's data may be obtained in different sampling rates and may contain various types of information, such as vision, inertial information, position, etc. According to one embodiment, the location data provided by the trained model may be used as a sensory input alongside other data from the sensor. By that, the navigation and mapping solution accuracy may be improved.

According to some embodiments, measurements taken from a plurality of vehicles 110 that pass in defined area or route 120 may be stored, for example, in database 150, as indicated in operation 370. In operation 380, anomaly detection techniques may be used to find changes in defined area or route 120 in a real-time and the map of defined area or route 120 may be updated. The anomaly detection techniques may include ML algorithms, including unsupervised ML classifiers that may classify new data as similar or different from the training dataset, e.g., K-means, Expectation-maximization, one class support vector machine (SVM), and others. In operation 390, a notification regarding a detected change in defined area or route 120 may be provided to drivers moving in defined area or route 120 or directly to vehicle 110. This technique may allow notifying vehicles 110 of risks in defined area or route 120, as may also be used for tuning the unsupervised ML model (e.g., the unsupervised ML model used for anomaly detection) to achieve higher accuracy by using the acquired data to train or retrain the unsupervised ML model.

Figure 5:
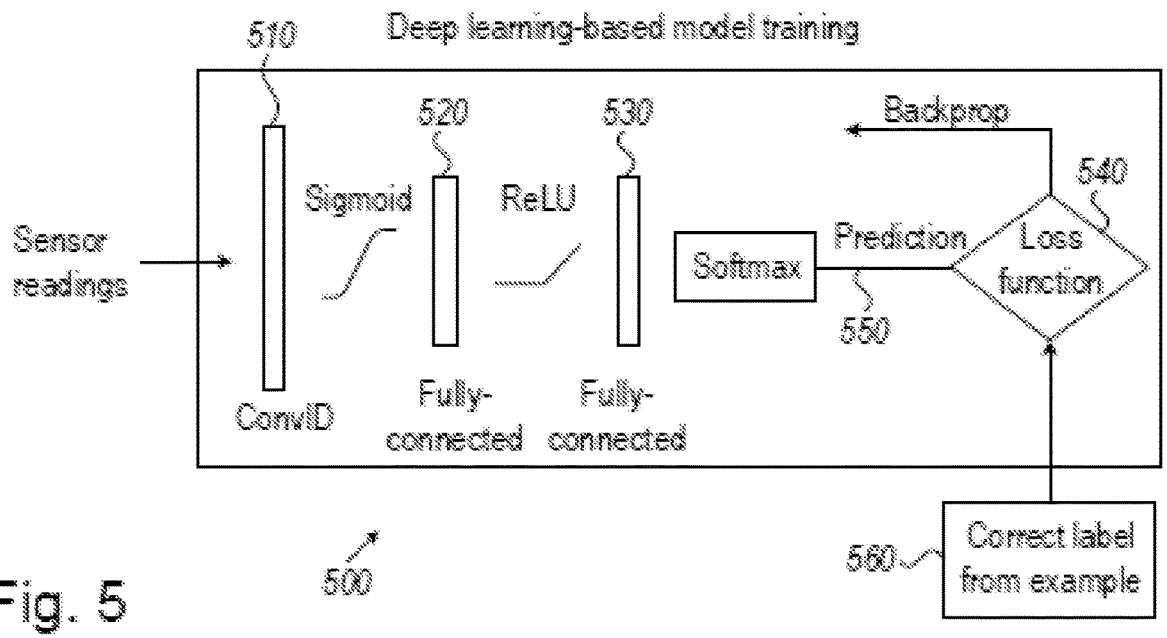
FIG. 5, presents a deep learning neural network (DL NN) model during training phase, according to some embodiments of the invention.

Reference is now made to FIG. 5, which presents a DL NN model 500 during training phase, according to some embodiments of the invention. The model presented in FIG. 5 is an example only. Other models may be used. DL NN model 500 may include at least three layers of nodes, e.g., a convolutional layer 510 and fully connected layers 520 and 530. In some embodiments, convolutional layer 510 may implement sigmoid function, fully connected layer 520 may implement ReLU function, and fully connected layer 530 may implement a SoftMax function. A loss function 540 may obtain the predictions 550 of DL NN model 500, and the location or position label 560 may adjust or tune parameters of DL NN model 500 through a backpropagation training scheme.

Figure 6:
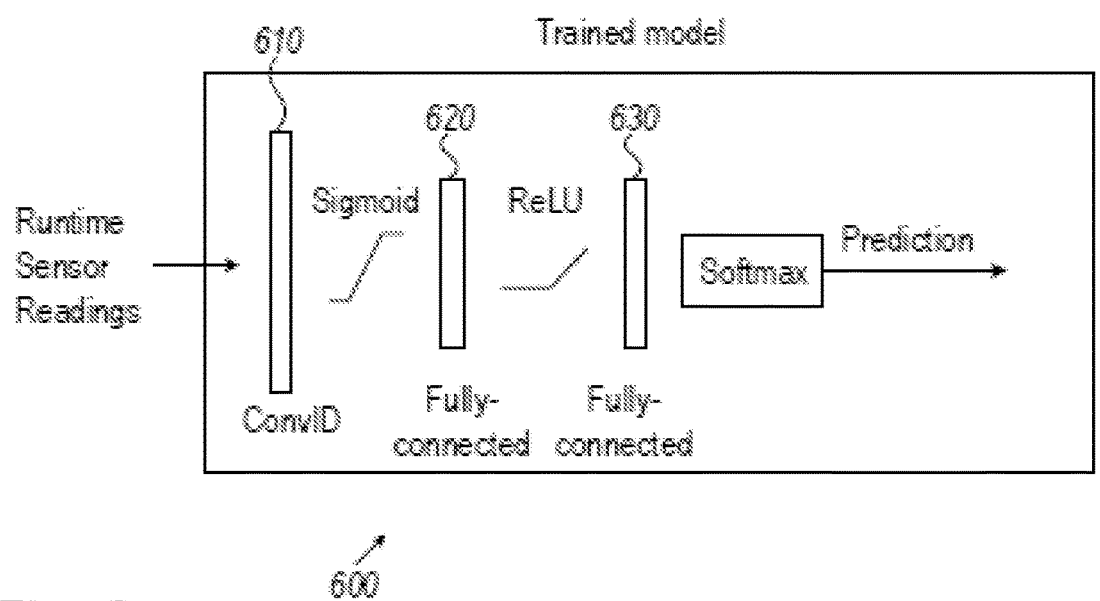
FIG. 6 presents the trained DL NN model, according to some embodiments of the invention.

FIG. 6 presents the trained DL NN model 600, including trained convolutional layer 610 and fully connected layers 620 and 630. The model presented in FIG. 6 is an example only. Other models may be used. Trained DL NN model 600 may obtain runtime sensor readings of vehicle 110 and may provide a prediction of the current location or position of vehicle 110.

Figure 7:
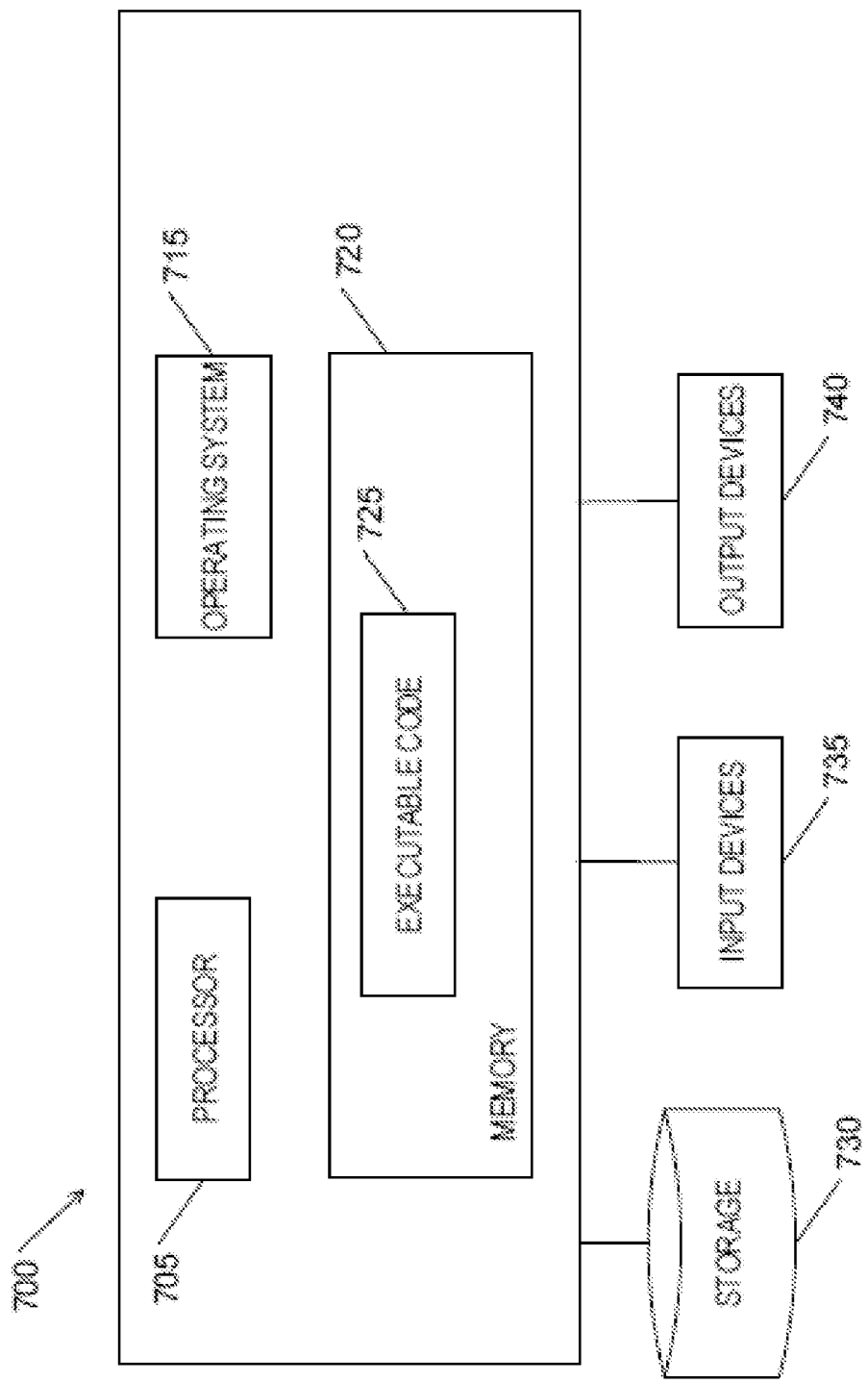
FIG. 7 shows a high-level block diagram of an exemplary computing device according to some embodiments of the present invention.

Reference is made to FIG. 7, showing a high-level block diagram of an exemplary computing device according to some embodiments of the present invention. Computing device 700 may include a processor 705 that may be, for example, a central processing unit processor (CPU) or any other suitable multi-purpose or specific processors or controllers, a chip or any suitable computing or computational device, an operating system 715, a memory 120, executable code 725, a storage system 730, input devices 735 and output devices 740. Processor 705 (or one or more controllers or processors, possibly across multiple units or devices) may be configured to carry out methods described herein, and/or to execute or act as the various modules, units, etc. or example when executing code 725. More than one computing device 700 may be included in, and one or more computing devices 700 may be, or act as the components of, a system according to embodiments of the invention. Various components, computers, and modules of FIG. 1 may be or include devices such as computing device 700, and one or more devices such as computing device 700 may carry out functions such as those described in FIG. 3. For example, navigation server may be implemented on or executed by a computing device 700.

Operating system 715 may be or may include any code segment (e.g., one similar to executable code 725) designed and/or configured to perform tasks involving coordination, scheduling, arbitration, controlling or otherwise managing operation of computing device 700, for example, scheduling execution of software programs or enabling software programs or other modules or units to communicate.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 720 may be or may include a plurality of, possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by processor 705 possibly under control of operating system 715. For example, executable code 725 may configure processor 705 to perform clustering of interactions, to handle or record interactions or calls, and perform other methods as described herein. Although, for the sake of clarity, a single item of executable code 725 is shown in FIG. 7, a system according to some embodiments of the invention may include a plurality of executable code segments similar to executable code 725 that may be loaded into memory 720 and cause processor 705 to carry out methods described herein.

Storage system 730 may be or may include, for example, a hard disk drive, a CD-Recordable (CD-R) drive, a Blu-ray disk (BD), a universal serial bus (USB) device or other suitable removable and/or fixed storage unit. Data such as the training dataset of accelerations, angular velocities, and known locations over time, the extracted features, ML model parameters (e.g., weights) and equations, runtime datasets of measured accelerations, angular velocities and extracted features as well as other data required for performing embodiments of the invention, may be stored in storage system 730 and may be loaded from storage system 730 into memory 720 where it may be processed by processor 705. Some of the components shown in FIG. 7 may be omitted. For example, memory 720 may be a non-volatile memory having the storage capacity of storage system 730. Accordingly, although shown as a separate component, storage system 730 may be embedded or included in memory 720.

Input devices 735 may be or may include a mouse, a keyboard, a microphone, a touch screen or pad or any suitable input device. Any suitable number of input devices may be operatively connected to computing device 700 as shown by block 735. Output devices 740 may include one or more displays or monitors, speakers and/or any other suitable output devices. Any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a printer, a universal serial bus (USB) device or external hard drive may be included in input devices 735 and/or output devices 740.

In some embodiments, device 700 may include or may be, for example, a personal computer, a desktop computer, a laptop computer, a workstation, a server computer, a network device, a smartphone or any other suitable computing device. A system as described herein may include one or more devices such as computing device 700.

Figure 8:
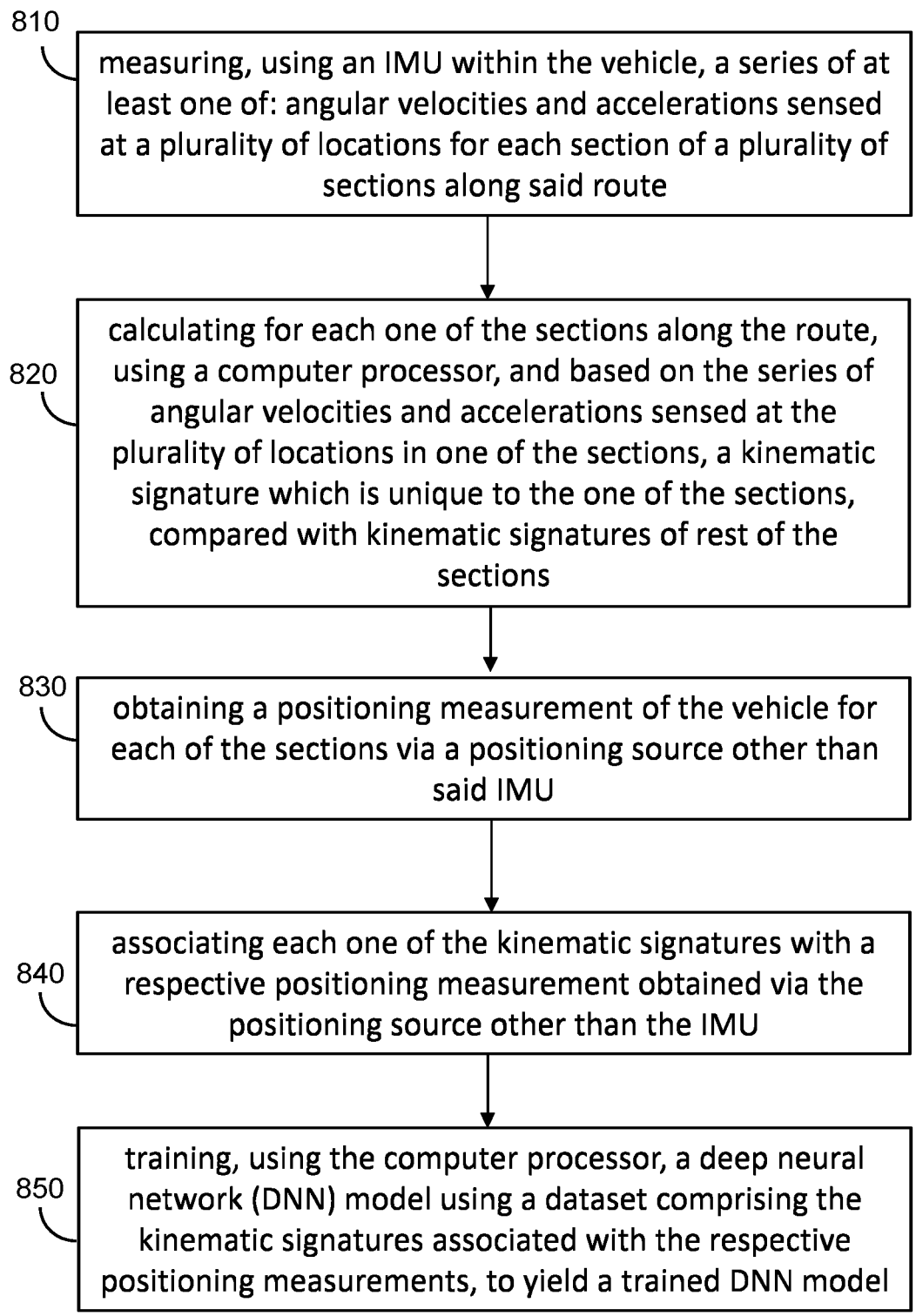
FIG. 8 shows a high-level flowchart diagram illustrating a method according to some embodiments of the present invention.

Reference is made to FIG. 8, showing a high-level flowchart illustrating a method of training a deep learning neural network (DL NN) for determining a location of a vehicle moving along a known route, in terms of geographic location, based on inertial measurement unit (IMU) measurements according to some embodiments of the present invention. Method 800 may include the following steps: measuring, using an IMU within the vehicle, a series of at least one of: angular velocities and accelerations sensed at a plurality of locations for each section of a plurality of sections along the route 810; calculating for each one of the sections along the route, using a computer processor, and based on the series of angular velocities and accelerations sensed at the plurality of locations in one of the sections, a kinematic signature which is unique to the one of the sections, compared with kinematic signatures of rest of the sections 820; obtaining a positioning measurement of the vehicle for each of the sections via a positioning source other than the IMU 830; associating each one of the kinematic signatures with a respective positioning measurement obtained via the positioning source other than the IMU 840; and training, using the computer processor, a deep learning neural network (DL NN) model using a dataset comprising the kinematic signatures associated with the respective positioning measurements, to yield a trained DL NN model 850.

According to some embodiments of the present invention, the kinematic signature may be indicative of at least one of: slope of the section and curve, imperfection of the respective section.

According to some embodiments of the present invention, the positioning source may include at least one of: a global navigation satellite system (GNSS) receiver and a real-time kinematic (RTK) positioning system, and camera/LiDAR/RADAR, and beacons.

According to some embodiments of the present invention, the route may include a route which is known in terms of geographic locations along its length.

According to some embodiments of the present invention, method 800 may further include the steps of: of obtaining, a real-time series of angular velocities and accelerations sensed at a plurality of locations along the route by the IMU within the vehicle; applying the real-time series of angular velocities and accelerations sensed at a plurality of locations to the trained DL NN model, to classify the real-time series of angular velocities and accelerations into one of the sections, based on the respective kinematic signature thereof; and determining the position of the vehicle, based on geographical location associated with the section classified by the DL NN model.

When discussed herein, "a" computer processor performing functions may mean one computer processor performing the functions or multiple computer processors or modules performing the functions; for example, a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method of training a deep neural network (DNN) for determining a location of a vehicle moving along a known route, in terms of geographic location, based on inertial measurement unit (IMU) measurements, the method comprising:
measuring, using an IMU within said vehicle, a series of at least one of: angular velocities and accelerations sensed at a plurality of locations for each section of a plurality of sections along said route;
calculating for each one of the sections along said route, using a computer processor, and based on the series of angular velocities and accelerations sensed at the plurality of locations in one of the sections, a kinematic signature which is unique to said one of the sections, compared with kinematic signatures of rest of the sections;
obtaining a positioning measurement of said vehicle for each of the sections via a positioning source other than said IMU;
associating each one of the kinematic signatures with a respective positioning measurement obtained via said positioning source other than said IMU; and
training, using said computer processor, a deep learning neural network (DL NN) model using a dataset comprising said kinematic signatures associated with the respective positioning measurements, to yield a trained DL NN model.

2. The method according to claim 1, wherein the IMU comprises at least three-axis accelerometer and at least one three-axis gyroscope.

3. The method according to claim 1, wherein said kinematic signature is indicative of at least one of: slope of the section and curve, imperfection of the respective section.

4. The method according to claim 1, wherein said positioning source comprises at least one of: a global navigation satellite system (GNSS) receiver and a real-time kinematic (RTK) positioning system, and camera/LiDAR/RADAR, and beacons.

5. The method of claim 1, wherein said route comprises a route which is known in terms of geographic locations along its length.

6. The method according to claim 1, further comprising:
obtaining, a real-time series of angular velocities and accelerations sensed at a plurality of locations along said route by the IMU within said vehicle,
applying the real-time series of angular velocities and accelerations sensed at a plurality of locations to the trained DL NN model, to classify the real-time series of angular velocities and accelerations into one of said sections, based on the respective kinematic signature thereof;
determining the position of the vehicle, based on geographical location associated with the section classified by the DL NN model.

7. A system of training a deep learning neural network (DL NN) model for determining a location of a vehicle moving along a known route in terms of geographic location, based on inertial measurement unit (IMU) measurements, the system comprising:
an IMU within said vehicle configured to measure a series of angular velocities and accelerations sensed at a plurality of locations for each section of a plurality of sections along said route;
a computer processor configured to calculate, for each of the sections along said route, and based on the series of angular velocities and accelerations sensed at the plurality of locations in one of the sections, a kinematic signature which is unique to said one of the sections, compared with kinematic signatures of rest of the sections; and
a positioning source other than said IMU configured to obtain a positioning measurement of said vehicle for each of the sections,
wherein the computer processor is further configured to associate each one of the kinematic signatures with a respective positioning measurement obtained via said positioning source other than said IMU, and
wherein the computer processor is further configured to train a deep learning neural network (DL NN) model using a dataset comprising said kinematic signatures associated with the respective positioning measurements, to yield trained DL NN model.

8. The system according to claim 7, wherein the IMU comprises at least one three-dimensional accelerometer and at least one three-dimensional gyroscope.

9. The system according to claim 7, wherein said kinematic signature is indicative of at least one of: horizontal slope of the section and horizontal curve of the respective section.

10. The system according to claim 7, wherein said positioning source comprises at least one of: a global navigation satellite system (GNSS) receiver and a real-time kinematic (RTK) positioning system, and camera/LiDAR/RADAR, and beacons.

11. The system according to claim 7, wherein said route comprises a route which is known in terms of geographic locations along its length.

12. The system according to claim 7, wherein the computer processor is further configured to:
obtain, a real-time series of angular velocities and accelerations sensed at a plurality of locations along said route by the IMU within said vehicle,
apply the real-time series of angular velocities and accelerations sensed at a plurality of locations to the trained DL NN model, to classify the real-time series of angular velocities and accelerations into one of said sections, based on the respective kinematic signature thereof; and
determine the position of the vehicle, based geographical location associated with the section classified by the DL NN model.

13. A non-transitory computer readable medium for training a deep learning neural network (DL NN) model for determining a location of a vehicle moving along a known route in terms of geographic location, based on inertial measurement unit (IMU) measurements, the computer readable medium comprising a set of instructions that, when executed, cause at least one computer processor to:
obtain a series of angular velocities and accelerations sensed at a plurality of locations for each section of a plurality of sections along said route measured by an IMU within said vehicle;
calculate, for each of the sections along said route, and based on the series of angular velocities and accelerations sensed at the plurality of locations in one of the sections, a kinematic signature which is unique to said one of the sections, compared with kinematic signatures of rest of the sections;

obtain a positioning measurement of said vehicle for each of the sections from a a positioning source other than said IMU;

associate each one of the kinematic signatures with a respective positioning measurement obtained via said positioning source other than said IMU, and train a deep neural network (NN) model using a dataset comprising said kinematic signatures associated with the respective positioning measurements, to yield trained DL NN model.

14. The non-transitory computer readable medium according to claim 13, wherein the IMU comprises at least one three-dimensional accelerometer and at least one three-dimensional gyroscope.

15. The non-transitory computer readable medium according to claim 13, wherein said kinematic signature is indicative of at least one of: horizontal slope of the section and horizontal curve of the respective section.

16. The non-transitory computer readable medium according to claim 13, wherein said positioning source comprises at least one of: a global navigation satellite system (GNSS) receiver and a real-time kinematic (RTK) positioning system, and camera/LiDAR/RADAR, and beacons.

17. The non-transitory computer readable medium according to claim 13, wherein said route comprises a route which is known in terms of geographic locations along its length.

18. The non-transitory computer readable medium according to claim 13, wherein the computer processor is further configured to:

obtain, a real-time series of angular velocities and accelerations sensed at a plurality of locations along said route by the IMU within said vehicle, apply the real-time series of angular velocities and accelerations sensed at a plurality of locations to the trained DL NN model, to classify the real-time series of angular velocities and accelerations into one of said sections, based on the respective kinematic signature thereof; and determine the position of the vehicle, based geographical location associated with the section classified by the DL NN model.

* * * * *